United States Patent [19]

Moriguchi et al.

[11] Patent Number: 5,930,122
[45] Date of Patent: Jul. 27, 1999

[54] INVERTER AND DC POWER SUPPLY APPARATUS WITH INVERTER USED THEREIN

[75] Inventors: Haruo Moriguchi, Itami; Toru Arai, Kyoto; Toshikazu Fujiyoshi, Kawanishi; Masayuki Ono, Toyonaka; Satoshi Hamada, Osaka; Hideo Ishii, Minoo, all of Japan

[73] Assignee: Sansha Electric Manufacturing Co., Limited, Osaka, Japan

[21] Appl. No.: 09/152,017

[22] Filed: Sep. 11, 1998

[30] Foreign Application Priority Data

Sep. 17, 1997 [JP] Japan ..................................... 9-272156

[51] Int. Cl.⁶ ............................ H02M 3/335; H02M 3/24
[52] U.S. Cl. .................................. 363/17; 363/98; 363/40
[58] Field of Search .................................. 363/17, 71, 40, 363/142, 143, 98, 132

[56] References Cited

FOREIGN PATENT DOCUMENTS 3-71218  11/1991  Japan .

OTHER PUBLICATIONS

Moriguchi et al; copending patent application 08/968,054 filed Nov. 12, 1997 entitled Power Supply Apparatus for Plasma Arc Utilizing Equipment.

Moriguchi et al.; copending patent application 09/159,485 filed Sep. 23, 1998 entitled "DC Power Supply Apparatus".

Shikata et al.; copending patent application 09/175,830 filed Oct. 20, 1998 entitled "DC Power Supply Apparatus".

Primary Examiner—Peter S. Wong
Assistant Examiner—Rajnikant B. Patel
Attorney, Agent, or Firm—William H. Murray

[57] ABSTRACT

An inverter includes a series circuit of two current conducting units connected between two input terminals adapted to be connected to a DC power supply. Two first capacitors are connected in series between the two input terminals. A primary winding of a transformer is connected between the junction of the current conducting units and the junction of the first capacitors. Each of the current conducting units includes a parallel circuit of an IGBT, a diode and a second capacitor. The IGBT has a collector, an emitter and a gate and is rendered conductive when a control signal is applied to the gate while a voltage of a predetermined polarity is applied between the collector and the emitter. The diode is connected in inverse parallel with the IGBT. An inverter control circuit applies alternately the control signals to the respective IGBTs with a predetermined quiescent period disposed between the respective control signals applied.

6 Claims, 3 Drawing Sheets

5,930,122

INVERTER AND DC POWER SUPPLY APPARATUS WITH INVERTER USED THEREIN

This application is based on Japanese Patent Application No. HEI 9-272156 filed on Sep. 17, 1997, which is incorporated herein by reference.

FIELD OF THE INVENTION

This invention relates to an inverter for converting a DC voltage into a high-frequency voltage. This invention relates also to a DC power supply apparatus using such inverter.

BACKGROUND OF THE INVENTION

DC power supplies employing an inverter may be used for, for example, an arc welder, an arc cutter, a plasma arc welder and an arc lamp. These apparatuses may be designed such that they can be driven from either one of two types of commercial AC power supplies one of which supplies a voltage of a magnitude half that of the other. Voltages supplied by such power supplies may be, for example, voltages of 100 V and 200 V, or 200 V and 400 V. An example of such apparatuses is disclosed in U.S. Pat. No. 5,272,313 issued to K. Karino et al. on Dec. 21, 1993.

The apparatus disclosed by Karino et al. is an arc welder, which can be driven from either one of two AC power supplies and includes an AC-to-DC converting unit and two high-frequency inverters. The AC-to-DC converting unit rectifies and smoothes a commercial AC voltage applied to the apparatus. The voltage supplied from the commercial AC power supply currently connected to the arc welder is detected to determine whether it is, for example, 100 V or 200 V. If the voltage is 100 V, the two high-frequency inverters are connected in parallel, and a DC voltage is applied from the AC-to-DC converting unit to the parallel circuit of the high-frequency inverters. On the other hand, if the voltage being applied is 200 V, the inverters are connected in series, and the DC voltage from the AC-to-DC converter is applied to the series circuit of the inverters. High-frequency voltages from the respective high-frequency inverters are voltage-transformed in a voltage transformer, and the voltage-transformed voltages are rectified and smoothed by another AC-to-DC converting unit and applied to a load.

The arc welder of Karino et al. employs two high-frequency inverters. Such high-frequency inverters use semiconductor switching devices, such as IGBTs, bipolar transistors and FETs for high-frequency switching. As the higher switching frequency is used, the size of the voltage transformer can be smaller, which results in an apparatus having a smaller size. On the other hand, as the switching frequency becomes higher, loss (switching loss) in the switching devices when they perform switching operation becomes larger.

An object of the present invention is to provide an inverter which can operate at a higher switching frequency without causing increase of switching loss. Another object of the present invention is to provide a DC power supply apparatus which employs such inverter in order to reduce the size of the DC power supply apparatus.

SUMMARY OF THE INVENTION

An inverter according to the present invention includes two input terminals adapted to be connected to a DC supply. First and second series circuits are connected in parallel between the input terminals. Each of the first and second series circuits includes two current conducting units connected in series. An output terminal is formed at the junction of the two current conducting units of the first series circuit, and another output terminal is formed at the junction of the two current conducting units of the second series circuit. An inductive load is connected between the two output terminals. Describing in a different way, the inverter is configured as a bridge circuit including a current conducting units in each of its branches, with a pair of nodes used as the input terminals and with another pair of nodes used as the output terminals. Each of the two current conducting units of the first series circuit includes a parallel circuit of a semiconductor switching device, a diode and a capacitor. The semiconductor switching device has a current conducting path and a control electrode. Current flows through the current conducting path in a predetermined direction when a control signal is applied to the control electrode while a voltage of a predetermined polarity is being applied across the current conducting path. The diode is connected in parallel with the current conducting path of the associated semiconductor switching device in such a polarity that it can conduct current in the direction opposite to the predetermined direction. The capacitor is connected in parallel with the diode. A control unit provides the control signal. The control signal is applied alternately to the respective ones of the two semiconductor switching devices with a predetermined resting period disposed between the application of the control signal to one of the switching devices and the application of the control signal to the other switching device.

The current conducting units of the second series circuit may be capacitors. Alternatively, each of the current conducting units of the second series circuit may include a semiconductor switching device, a diode and a capacitor which are similar to those of the first series circuit.

A DC power supply apparatus according to the present invention has a voltage transformer. The transformer has a primary winding connected between the output terminals of the inverter of the above-described arrangement. A secondary winding of the voltage transformer has a tap. A rectifier is connected between the tap on the secondary winding and each of the two ends of the secondary winding, with a saturable reactor connected in series with each rectifier.

In the DC power supply apparatus with the above-described arrangement, a DC voltage may be supplied to the inverter in the following manner. An AC voltage from an AC power supply is rectified in an input-side rectifier unit. The rectified voltage is then smoothed by a smoothing capacitor, which provides a smoothed voltage to the inverter.

A DC power supply apparatus according to another embodiment of the present invention includes an input terminal to which either one of first and second AC power supplies is connected. The second AC power supply provides a voltage of a magnitude of about one-half that of the voltage the first AC power supply provides. An input-side rectifier rectifies the AC voltage supplied to the input terminal, and a smoothing capacitor is connected to smooth the output voltage of the input-side rectifier. A pair of inverters with the aforementioned arrangement is connected across the smoothing capacitor. A judgment unit determines whether the voltage applied to the input terminal is supplied from the first AC power supply or from the second AC power supply. When the judgment unit judges that the first AC power supply is supplying a voltage to the input terminal, it provides a first signal to a switching unit. In response to the first signal from the judgment unit, the switching unit causes the inverters to be connected in series across the smoothing capacitor. If the judgment unit judges that the second AC power supply is supplying a voltage to the input terminal, it provides a second signal to the switching unit, which causes the inverters to be connected in parallel with each other. Two transformers have respective primary and secondary windings. The primary windings of the transformers are coupled to the respective ones of the output terminals of the inverters. The secondary windings are connected in series with each other. A series circuit of an output-side rectifier and a saturable reactor is connected to each of the two ends of the series circuit of the secondary windings.

DESCRIPTION OF PREFERRED EMBODIMENTS

Figure 1:
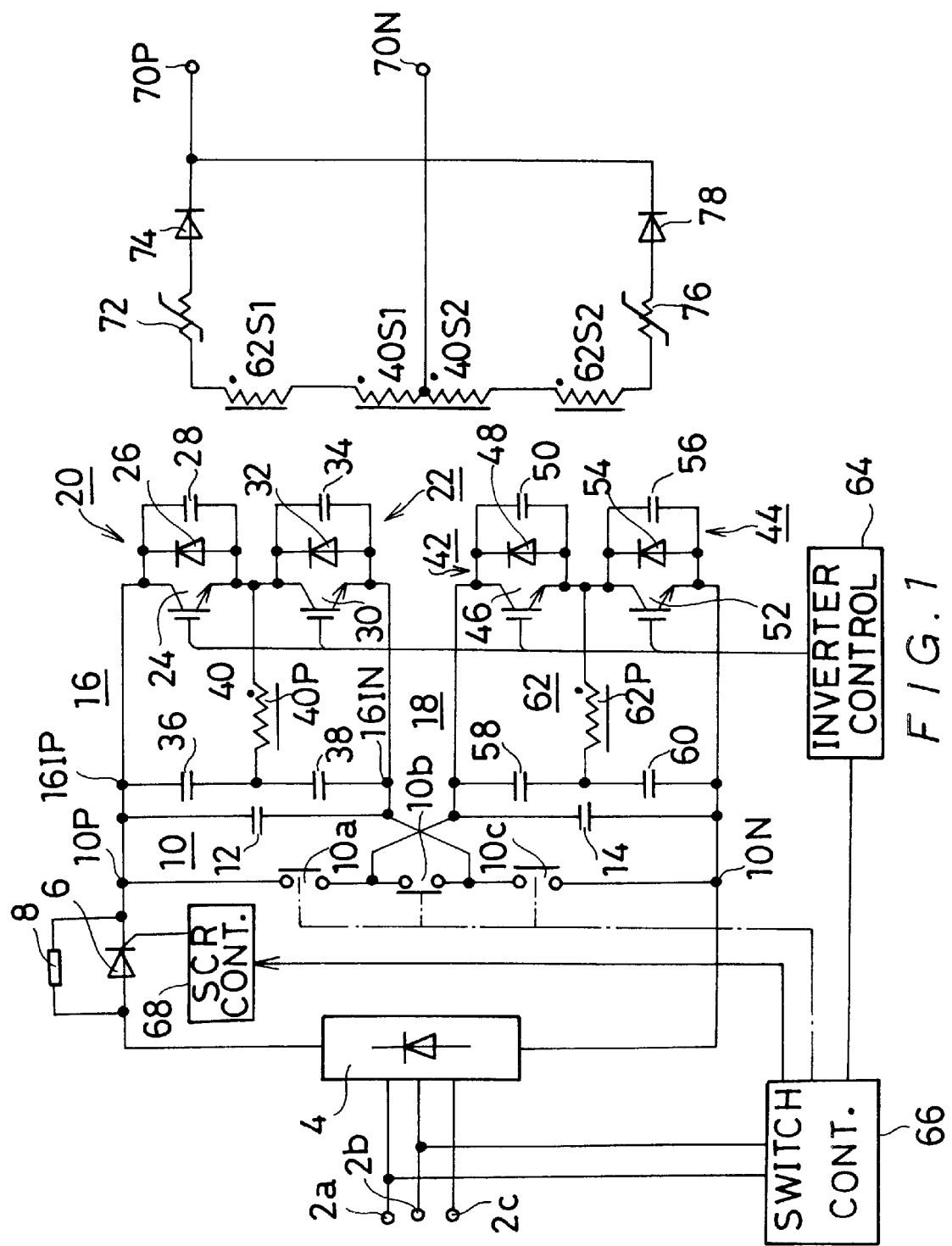
FIG. 1 is a block diagram of a DC power supply apparatus according to one embodiment of the present invention.

A DC power supply apparatus according to a first embodiment is described with reference to FIG. 1 and FIG. 2.

The DC power supply apparatus according to the first embodiment may be used for, for example, arc-utilizing apparatuses, such as an arc welder and an arc cutter, and an arc discharge lamp.

Power supply input terminals 2a, 2b and 2c receive either a first voltage of, for example, 400 V or a second voltage of a value about half that of the first voltage, i.e. 200 V, from a three-phase commercial AC power supply (not shown). Alternatively, other combination of first and second voltages may be used. For example, the first voltage may be 200 V, whereas the second voltage is 100 V. Furthermore, instead of a three-phase commercial AC power supply, a single-phase commercial AC power supply may be used to provide first and second voltages one of which has a value about half that of the other.

The three-phase AC voltage applied to the input terminals 2a–2c is half-wave or full-wave rectified in an input-side rectifier 4, which may be a known rectifier. The output of the rectifier 4 is applied between terminals 10P and 10N of a switching unit 10 through a parallel circuit of a thyristor 6 and a resistor 8.

The switching unit 10 includes a normally open switch 10a, a normally closed switch 10b and a normally open switch 10c connected in series in the named order between the terminals 10P and 10N with the switch 10a connected to the terminal 10P. A smoothing capacitor 12 is connected between the junction of the normally closed switch 10b and the normally open switch 10c and the terminal 10P. Another smoothing capacitor 14 is connected between the junction of the normally closed switch 10b and the normally open switch 10a and the terminal 10N.

A high-frequency inverter 16 is connected in parallel with the smoothing capacitor 12, and a high-frequency inverter 18 is connected in parallel with the smoothing capacitor 14.

The high-frequency inverter 16 may be, for example, a half bridge inverter, which includes a first series circuit of current conducting units 20 and 22 connected between input terminals 16IP and 16IN. The current conducting unit 20 includes a semiconductor switching device 24, e.g. an IGBT, and a diode 26 connected in inverse parallel connection with the current conduction path, e.g. the collector-emitter path. In other words, the cathode of the diode 26 is connected to the collector of the IGBT 24, and the anode is connected to the emitter of the IGBT 24. The current conducting unit 20 includes also a capacitor 28 connected in parallel with the diode 26. The current conducting unit 22 includes an IGBT 30, a diode 32 and a capacitor 34, which are connected in the same manner as the IGBT 24, the diode 26 and the capacitor 28 of the current conducting unit 20. Bipolar transistors or FETs, for example, may be used in place of the IGBTs.

The high-frequency inverter 16 includes further a second series circuit of serially connected current conducting devices, e.g. capacitors 36 and 38. The second series circuit is connected in parallel with the first series circuit.

The junction between the capacitors 36 and 38 and the junction of the IGBTs 24 and 30 provide output terminals of the high-frequency inverter 16, and an inductive load, e.g. a primary winding 40P of a transformer 40, is connected between these output terminals.

The high-frequency inverter 18 is arranged similarly to the high-frequency inverter 16 and includes current conducting units 42 and 44. The current conducting unit 42 includes an IGBT 46, a diode 48 and a capacitor 50, and the current conducting unit 44 includes an IGBT 52, a diode 54 and a capacitor 56. The connection of the IGBT 46, the diode 48 and the capacitor 50 and the connection of the IGBT 52, the diode 54 and the capacitor 56 are similar to the connections of the components of the current conducting units 20 and 22.

The high-frequency inverter 18 also includes current conducting devices, e.g. capacitors 58 and 60 connected in series. The junction of the capacitors 58 and 60 and the junction of the IGBTs 46 and 52 provide output terminals of the high-frequency inverter 18. An inductive load, e.g. a primary winding 62P of a transformer 62 is connected between these output terminals.

The IGBTs 24, 30, 46 and 52 of the high-frequency inverters 16 and 18 are PWM-controlled by control signals supplied from a control unit, e.g. an inverter control unit 64 to their control electrodes, e.g. gates.

When the switching unit 10 is in the state shown in FIG. 1, the parallel circuit of the smoothing capacitor 12 and the high-frequency inverter 16 and the parallel circuit of the smoothing capacitor 14 and the high-frequency inverter 18 are connected in series. The operation of the switching unit 10 is switched by a voltage-judgment unit, e.g. a switch control circuit 66. The switch control circuit 66 receives a voltage applied between, for example, the input terminals 2a and 2b. When the voltage between the input terminals 2a and 2b is 400 V, the switch control circuit 66 keeps the normally open switches 10a and 10c open and keeps the normally closed switch 10c closed. This state is the state shown in FIG. 1, in which the parallel circuit of the smoothing capacitor 12 and the high-frequency inverter 16 and the parallel circuit of the smoothing capacitor 14 and the high-frequency inverter 18 are connected in series.

If the voltage between the input terminals 2a and 2b is 200 V, the switch control circuit 66 closes the normally open switches 10a and 10c and opens the normally closed switch 10b. In this state, the parallel circuit of the smoothing capacitor 12 and the high-frequency inverter 16 and the parallel circuit of the smoothing capacitor 14 and the high-frequency inverter 18 are connected in parallel.

Thus, regardless whether the input voltage between the input terminals 2a and 2b is 400 V or 200 V, the same voltage is applied to the high-frequency inverters 16 and 18. The above-described control of the switching unit 10 can be realized by, for example, using relay contacts for the switches 10a, 10b and 10c, and using a relay driving circuit in the switch control circuit 66 for opening and closing the relay contacts.

The switch control circuits 66 supplies a signal to a thyristor control circuit 68, which controls the thyristor 6. A predetermined time after the application of the input voltage to the input terminals 2a–2c, the switching control circuit 66 provides a signal to the thyristor control circuit 68 to render the thyristor 6 conductive. Thus, during the initial period of operation, current is supplied through the resistor 8, which limits the current to be supplied to the inverters 16 and 18, and, after sufficient current begins to flow, the resistor 8 is short-circuited by the conducting thyristor 6.

Th switch control circuit 66, when receiving a voltage applied between the input terminals 2a and 2c, rectifies and smoothes the received voltage into a constant voltage and applies it to drive the inverter control unit 64.

It may be arranged that the rectified and smoothed voltage from the switch control circuit 66 be compared with a reference voltage in a comparator circuit to control the switches 10a, 10b and 10c in accordance with the result of comparison.

The transformer 40 has two secondary windings 40S1 and 40S2, and the transformer 62 also has two secondary windings 62S1 and 62S2. The two secondary windings may be formed by providing a tap at an intermediate point on a single secondary winding. The secondary windings 40S1 and 40S2 of the transformer 40 are connected in series in an additive polarity with each other. The junction between the secondary windings 40S1 and 40S2 provides an output terminal 70N of the power supply apparatus. The secondary winding 40S1 is also connected in series in an additive polarity with the secondary winding 62S1 of the transformer 62, and the secondary winding 40S2 is connected in series in an additive polarity with the secondary winding 62S.

The secondary winding 62S1 is connected to an output terminal 70P of the power supply apparatus through a series circuit of a saturable reactor 72 and an output-side rectifying diode 74. The secondary winding 62S2 is connected to the output terminal 70P through a series circuit of another saturable reactor 76 and another output-side rectifying diode 78. A saturable reactor is a device which conducts substantially no current when it is in an unsaturated state and conducts current therethrough when it is in a saturated state. When current is flowing through the saturable reactor, a large phase difference is exhibited between the current flowing therethrough and the voltage thereacross. Accordingly, whether the saturable reactors 72 and 76 are saturated and unsaturated, respectively, or the saturable reactors 72 and 76 are unsaturated and saturated, respectively, a large phase difference is exhibited between the current and voltage of each of the high-frequency inverters 16 and 18 which are connected to the primary windings of the transformers 40 and 62, respectively.

The transformers 40 and 62 may include separate cores on which the primary and secondary windings 40P, 40S1 and 40S2 and the primary and secondary windings 62P, 62S1 and 62S2 are respectively wound. Alternatively, the primary and secondary windings 40P, 40S1 and 40S2 of the transformer 40 and the primary and secondary windings 62P, 62S1 and 62S2 of the transformer 62 may be wound on different legs of a single core in such a manner that the primary and secondary windings of the transformer 40 is loosely coupled with the primary and secondary winding of the transformer 62.

The high-frequency inverters 16 and 18 operate in the same manner. Accordingly, the operation of only the high-frequency inverter 16 is described with reference to FIG. 2.

In the high-frequency inverter 16, control signals, e.g. gate signals G24 and G30, shown by solid and dash-and-dot lines in FIG. 2(a) are applied to the gates of the IGBTs 24 and 30, respectively, from the inverter control unit 64. Although, in FIG. 2(a), a single line is shown to interconnect the inverter control unit 64 and the gates of the four IGBTs 24, 30, 46 and 52, the gate signals are actually coupled to the respective gates through different lines.

The gate signals G24 and G30 have conduction width not greater than but near to 180°. The inverter control unit 64 provides the gate signals G24 and G30 alternately with a quiescent period t between them, during which a gate signal is applied to neither IGBT. The phase difference between the gate signals G24 and G30 is variable over a range of from 0° to 180°

Figure 2:
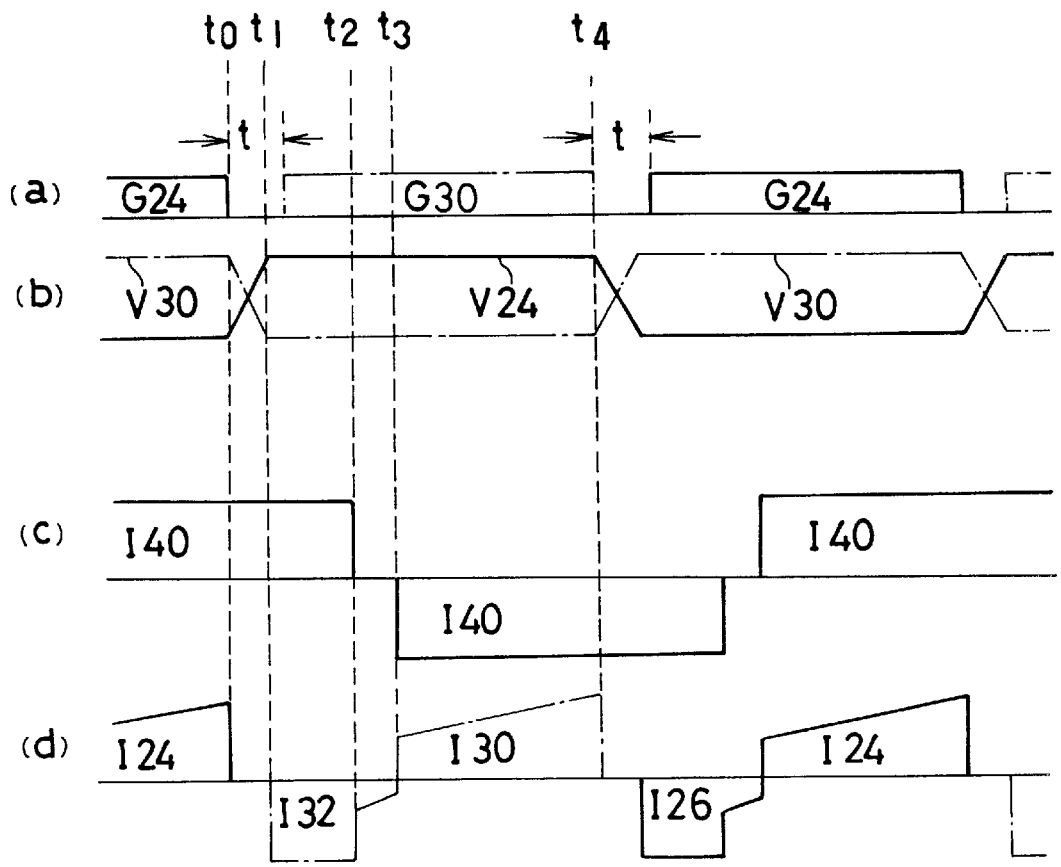
FIG. 2 shows waveforms of signals appearing at various portions of the DC power supply apparatus of FIG. 1.

Referring to FIG. 2, during a period before a time t0, the IGBT 24 is conductive, so that current flows through the IGBT 24, the primary winding 40P of the transformer 40 and the capacitor 38, and, thus, the capacitor 38 is charged. The current I40 flowing through the primary winding 40P of the transformer 40 is shown in FIG. 2(c). At the same time, the capacitor 34 is also charged, so that a voltage V30 indicated by a dash-and-dot line in FIG. 2(b) is developed between the collector and emitter of the IGBT 30. Since the IGBT 24 is conductive, the capacitor 28 connected in parallel with the IGBT 24 is not charged, so that the voltage V24 across the IGBT 24 is 0 V as indicated by a solid line in FIG. 2(b).

I24, I30, I26 and I32 in FIG. 2 represent the current flowing through the collector-emitter path of the IGBT 24, the current flowing through the collector-emitter path of the IGBT 30, the current flowing through the diode 26 and the current flowing through the diode 32, respectively. During the period before the time t0, the current I24 flows. The saturable reactor 72 and the rectifying diode 74 rectify the voltage induced in the secondary windings 40S1 and 40S2 of the transformer 40. The saturable reactor 72 has been saturated due to the sufficient current conduction therethrough.

At the time t0, the gate signal G24 disappears, so that the current I24 in the IGBT 24 becomes zero (0) as shown in FIG. 2(d). At this time, current flows from the input terminal 16IP of the inverter 16 through the capacitor 28, the primary winding 40P and the capacitor 38, so that the charging of the capacitor 28 begins. As the capacitor 28 is charged, the voltage V24 between the collector and emitter of the IGBT 24 starts increasing as indicated by the solid line in FIG. 2(b). The increase of the voltage V24 starts when the current I24 in the IGBT 24 becomes zero. Because of the non-conduction of the IGBT 24, the capacitor 34 starts discharging, so that the collector-emitter voltage V30 of the IGBT 30 starts to decrease as indicated by the dot-and-dash line in FIG. 2(b).

When the discharging of the capacitors 34 and the charging of the capacitor 28 end at a time t1 in the quiescent period, the diode 32 is released from the reverse biased condition and, therefore, is rendered conductive. This causes the energy stored in the primary winding 40P of the transformer 40 is released through the capacitor 38 and the diode 32, and the current I40 continues to flow. This causes current to flow through the saturable reactor 72 and the diode 74, so that the saturable reactor 72 remains saturated.

In this condition, as indicated by the dot-and-dash line in FIG. 2(a), the gate signal G30 is applied to the gate of the IGBT 30, but the IGBT 30 is not rendered conductive because the collector and emitter of the IGBT 30 are short-circuited by the diode 32.

At a time t2, the release of all the energy in the primary winding 40P of the transformer 40 is completed, so that the current I40 flowing through the primary winding 40P of the transformer 40 becomes zero, and the voltages induced across the secondary windings 40S1 and 40S2 of the transformer 40 are reversed. The induced voltages immediately after the reversion are low, and, therefore, the saturable reactor 76 remains unsaturated and non-conductive. Also, because the current flowing through the primary winding 40P of the transformer 40 has become zero, the saturable reactor 72, which has been saturated, becomes unsaturated.

At a time t3, the diode 32 becomes completely non-conductive, and the IGBT 30 is rendered conductive. Current I30 starts flowing. Thus, current flows in the opposite direction through the primary winding 40P of the transformer 40. The saturable reactor 76, which has been unsaturated, is brought into a saturated state, and current flows through the load. When the IGBT 30 is conductive, its collector-emitter voltage is zero.

At a time t4, the gate signal G30 disappears, which results in non-conduction of the IGBT 30, so that the capacitor 34 discharges and the capacitor 28 is charged.

After that, the above-described operation is repeated.

As described above, after the gate signal G24 or G30 disappears, which causes the current I24 or I30 to disappear, the voltage between the collector and emitter of the IGBT 24 or 30 increases due to the charging of the associated capacitor 28 or 34. With the gate signal G24 or G30 being applied to the IGBT 24 or 30, current continues to flow through the IGBT 24 or 30 even after the voltage between the collector and emitter becomes zero. Switching loss of the inverter would occur if both current and voltage were simultaneously applied to the IGBT 24 or 30. Thus, according to the described embodiment, such switching loss can be avoided. The saturable reactors 72 and 76, which exhibit a phase difference between current flowing therethrough and voltage thereacross in the saturated state, further prevent simultaneous application of a current and voltage to the IGBTs 24 and 30.

As described previously, the switch control circuit 66 detects which voltage, a voltage of 400 V or 200 V, is applied to the input terminals 2a–2c. When the applied voltage is 400 V, the switch control circuit 66 connects the inverters 16 and 18 in series with each other. If the applied voltage is of 200 V, the switch control circuit 66 connects the inverters 16 and 18 in parallel with each other. The inverter control unit 64 controls the IGBTs 24, 30, 46 and 52 so that the high-frequency inverters 16 and 18 generate high-frequency voltages, which are voltage-transformed in the transformers 40 and 62. The voltage-transformed voltages are rectified by the diodes 74 and 78 and applied to a load through the output terminals 70P and 70N.

Figure 3:
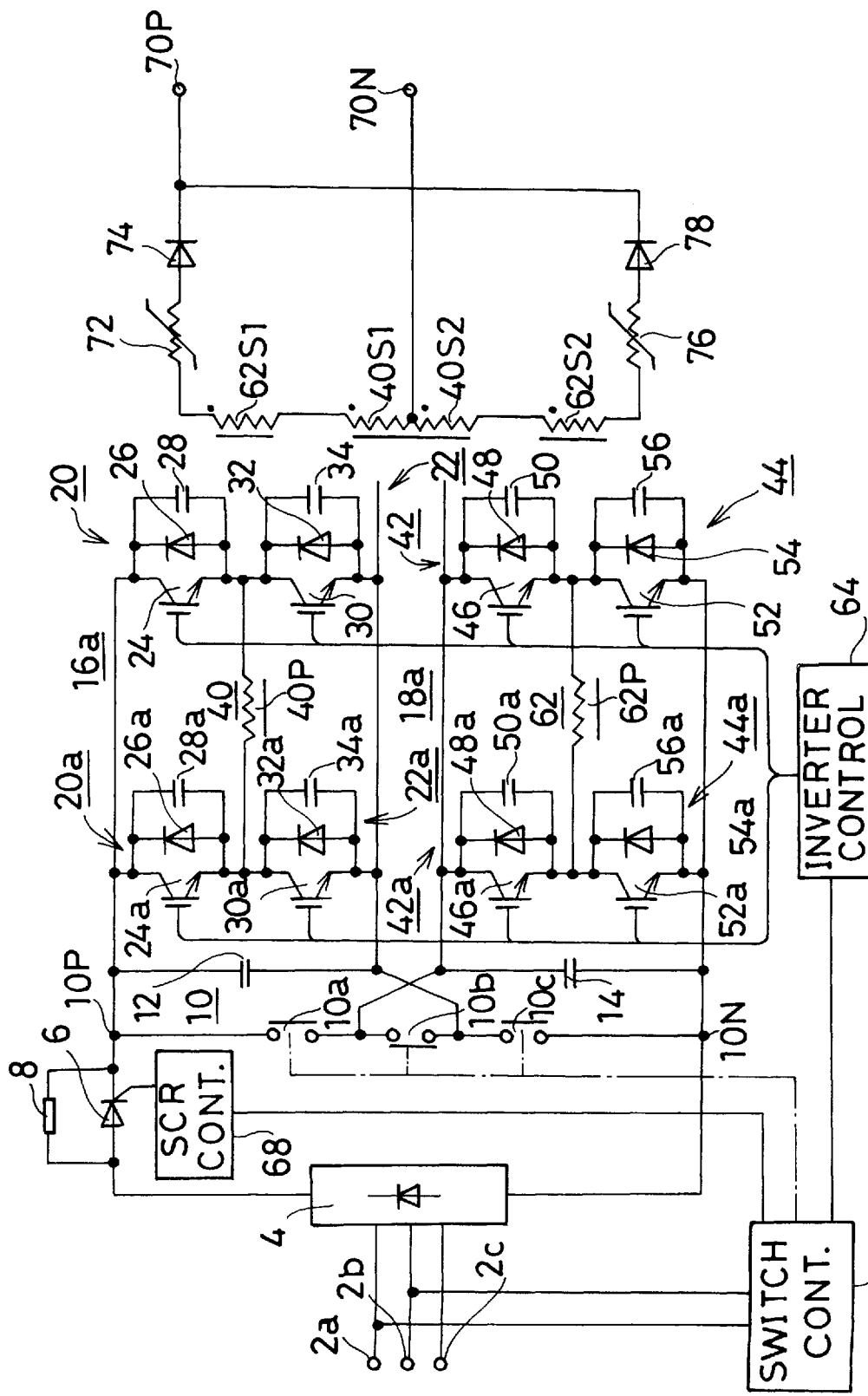
FIG. 3 is a block diagram of a DC power supply apparatus according to a second embodiment of the present invention.

A DC power supply apparatus according to a second embodiment is shown in FIG. 3. As shown, the DC power supply apparatus according to the second embodiment differs from the above-described apparatus according to the first embodiment only in that it includes inverters 16a and 18a each of which is arranged in a full-bridge inverter configuration. Accordingly, the same symbols and reference numerals as used in FIG. 1 are used for similar components and functions, and their detailed description is not given.

The inverter 16a is the same as the inverter 16 in the first embodiment except that in place of the capacitors 36 and 38, current conducting units 20a and 22a are used. The current conducting unit 20a includes an IGBT 24a, a diode 26a and a capacitor 28a, and the current conducting unit 22a includes an IGBT 30a, a diode 32a and a capacitor 34a.

Similarly, the inverter 18a is configured similar to the inverter 18 in the first embodiment except that, in place of the capacitors 58 and 60, current conducting units 42a and 44a are used. The current conducting unit 42a includes an IGBT 46a, a diode 48a and a capacitor 50a, and the current conducting unit 44a includes an IGBT 52a, a diode 54a and a capacitor 56a. The IGBTs 24a, 30a, 46a and 52a are PWM-controlled by control signals from the inverter control unit 64 as the IGBTs 24, 30, 46 and 52 of the first embodiment.

In the half-bridge inverters 16 and 18 used in the DC power supply apparatus of the first embodiment, all the collector-emitter voltages of the IGBTs 24, 30, 46 and 52 may not be equal. Accordingly, one of the IGBTs may receive an excessive voltage, so that it may be damaged. For voltage balancing, a voltage balancing apparatus may be used. The use of the full-bridge inverters 16a and 18a of the second embodiment can eliminate the need for use of a voltage balancing apparatus in the input of the inverters 16a and 18a because the voltage imbalance between the inverters 16a and 18a is small.

The inverters 16 and 18 in the first embodiment, or the inverters 16a and 18a in the second embodiment, are selectively connected in series or in parallel, depending on the magnitude of the input voltage. However, it should be noted that only one of the inverters 16, 18, 16a and 18a may be used alone. Alternatively, the inverters 16 and 18 or 16a and 18a may be used in series alone or in parallel alone, without switching the connection. Further, the saturable reactors may be removed.

What is claimed is:

1. An inverter comprising:

two input terminals adapted to be connected to a DC power supply;

first and second current conducting units connected in series between said two input terminals;

third and fourth current conducting units corresponding respectively to said first and second current conducting units, said third and fourth current conductive units being connected in series between said two input terminals; and two output terminals between which an inductive load is adapted to be connected, said output terminals being provided by the junction of said first and second current conducting units and the junction of said third and fourth current conducting units;

said first current conducting unit comprising a first semiconductor switching device having a first current conducting path and having a first control electrode, said first semiconductor switching device conducting current in a predetermined direction through said first current conducting path with a voltage of a predetermined polarity being applied thereacross when a first control signal is applied to said first control electrode, said first current conducting unit further comprising a first diode coupled across said first current conducting path in such a manner as to conduct current therethrough in the direction opposite to said predetermined direction, and a first capacitor connected in parallel with said first diode;

said second current conducting unit comprising a second semiconductor switching device having a second current conducting path and having a second control electrode, said second semiconductor switching device conducting current in said predetermined direction through said second current conducting path with a voltage of said predetermined polarity being applied thereacross when a second control signal is applied to said second control electrode, said second current conducting unit further comprising a second diode coupled across said second current conducting path in such a manner as to conduct current therethrough in the direction opposite to said predetermined direction, and a second capacitor connected in parallel with said second diode;

wherein, when current is flowing through said first current conducting path and no current is flowing through said second current conducting path, the current through said first current conducting path flows through said inductive load and said fourth current conducting unit, and when no current is flowing through said first current conducting path and current is flowing through said second current conducting path, the current through said second current conducting path flows through said third current conducting unit and said inductive load;

said inverter further comprising a control unit for applying said first and second control signals to said first and second control electrodes, respectively, said control unit repeating a cycle comprising a first active period in which said first control signal is applied to said first control electrode, whereas said second control signal is not applied to said second control electrode, a first quiescent period following said first active period in which neither of said first and second control signals is applied to said control electrodes, a second active period following said first quiescent period in which said first control signal is not applied to said first control electrode, whereas said second control signal is applied to said second control electrode, and a second quiescent period following said second active period in which neither of said first and second control signals is applied to said control electrodes;

wherein said first and second capacitors are discharged and charged, respectively, in said first active period, said first and second capacitors are charged and discharged, respectively, in said first quiescent period, and current flows through said inductive load and said fourth current conducting unit to said second diode in a beginning portion of said second active period.

2. A DC power supply apparatus comprising:
the inverter as defined by claim 1;
a transformer having a primary winding connected between said output terminals of said inverter, and having a secondary winding having an intermediate tap;
rectifiers connected between respective ones of two ends of said secondary winding and said intermediate tap; and
saturable reactors connected in series with the respective ones of said rectifiers.

3. The DC power supply apparatus according to claim 2, further comprising:
an input terminal adapted to be connected to an AC power supply;
an input-side rectifier for rectifying an AC voltage applied to said input terminal; and a smoothing capacitor for smoothing an output of said rectifier for coupling to said input terminal of said inverter.

4. The inverter according to claim 1 wherein each of said third and fourth current conducting units comprises a capacitor.

5. The inverter according to claim 1 wherein said third current conducting unit comprises a third semiconductor switching device, a third diode and a third capacitor, similar to said first semiconductor switching device, said first diode and said first capacitor, respectively, and said fourth current conducting unit comprises a fourth semiconductor switching device, a fourth diode and a fourth capacitor, similar to said second semiconductor switching device, said second diode and said second capacitor, respectively.

6. A DC power supply apparatus comprising:
two supply voltage input terminals between which either a first AC voltage or a second AC voltage having a magnitude about one-half that of said first AC voltage is to be applied;
an input-side rectifier for rectifying an AC voltage applied between said two supply voltage input terminals;
a smoothing capacitor for smoothing an output of said input-side rectifier;
a pair of inverters, each having two input terminals and two output terminals;
a judgment unit for judging which one of said first and second AC voltages is being applied between said supply voltage input terminals;
a switching unit for causing said invertors to be connected in series across said smoothing capacitor in response to a first signal suppled thereto from said judgment unit when said judgment unit judges that said first AC voltage is being applied between said supply voltage input terminals, and for causing said inverters to be connected in parallel across said smoothing capacitor in response to a second signal suppled thereto from said judgment unit when said judgment unit judges that said second AC voltage is being applied between said supply voltage input terminals;
two transformers associated with the respective ones of said pair of inverters, each having a primary winding and a secondary winding, each of said primary windings being connected between said two output terminals of an associated one of said inverters, said secondary windings being connected in series; and
two series circuits each comprising an output-side rectifier and a saturable reactor and being connected to each of opposite ends of the series circuit of said secondary windings;
wherein each of said inverters comprises:
first and second current conducting units connected in series between said two input terminals; and
third and fourth current conducting units corresponding respectively to said first and second current conducting units, said third and fourth current conducting units being connected in series across said smoothing capacitor;
said two output terminals being provided by the junction of said first and second current conducting units and the junction of said third and fourth current conducting units;
said first current conducting unit comprising a first semiconductor switching device having a first current conducting path and having a first control electrode, said first switching device conducting current in a predetermined direction through said first current conducting path when a first control signal is applied to said first semiconductor control electrode, while a voltage of a predetermined polarity is being applied across said first current conducting path, said first current conducting unit further comprising a first diode coupled across said first current conducting path in such a manner as to conduct current therethrough in the direction opposite to said predetermined direction, and a first capacitor connected in parallel with said first diode;

said second current conducting unit comprising a second semiconductor switching device having a second current conducting path and having a second control electrode, said second semiconductor switching device conducting current in said predetermined direction through said second current conducting path when a second control signal is being applied to said second control electrode, while a voltage of said predetermined polarity is applied across said second current conducting path, said second current conducting unit further comprising a second diode coupled across said second current conducting path in such a manner as to conduct current therethrough in the direction opposite to said predetermined direction, and a second capacitor connected in parallel with said second diode;

wherein, when current is flowing through said first current conducting path and no current is flowing through said second current conducting path, the current through said first current conducting path flows through said primary winding of said transformer associated with that inverter and said fourth current conducting unit, and when no current is flowing through said first current conducting path and current is flowing through said second current conducting path, the current through said second current conducting path flows through said third current conducting unit and said primary winding of said associated transformer;

said inverter further comprising a control unit for applying said first and second control signals to said first and second control electrodes, respectively, said control unit repeating a cycle comprising a first active period in which said first control signal is applied to said first control electrode, whereas said second control signal is not applied to said second control electrode, a first quiescent period following said first active period in which neither of said first and second control signals is applied to said control electrodes, a second active period following said first quiescent period in which said first control signal is not applied to said first control electrode, whereas said second control signal is applied to said second control electrode, and a second quiescent period following said second active period in which neither of said first and second control signals is applied to said control electrodes;

wherein said first and second capacitors are discharged and charged, respectively, in said first active period, said first and second capacitors are charged and discharged, respectively, in said first quiescent period, and current flows through said primary winding of said associated transformer and said fourth current conducting unit to said second diode in a beginning portion of said second active period.

\* \* \* \* \*